United States Patent
Kohl et al.

(10) Patent No.: US 9,924,565 B2
(45) Date of Patent: Mar. 20, 2018

(54) MODULAR INDUCTION FLUID HEATER

(71) Applicants: MAHLE International GmbH, Stuttgart (DE); Behr-Hella Thermocontrol GmbH, Lippstadt (DE)

(72) Inventors: Michael Kohl, Bietigheim-Bissingen (DE); Harri Pankratz, Soest (DE); Ralph Trapp, Paderborn (DE)

(73) Assignees: MAHLE International GmbH, Stuttgart (DE); Behr-Hella Thermocontrol GmbH, Lippstadt (DE)

( * ) Notice: Subject to any disclaimer, the term of this patent is extended or adjusted under 35 U.S.C. 154(b) by 381 days.

(21) Appl. No.: 14/518,131

(22) Filed: Oct. 20, 2014

(65) Prior Publication Data

US 2015/0034631 A1    Feb. 5, 2015

Related U.S. Application Data

(63) Continuation of application No. PCT/EP2013/057681, filed on Apr. 12, 2013.

(30) Foreign Application Priority Data

Apr. 20, 2012 (DE) .................. 10 2012 206 603

(51) Int. Cl.
  *H05B 6/10* (2006.01)
  *F24H 1/10* (2006.01)
  (Continued)

(52) U.S. Cl.
  CPC .............. *H05B 6/10* (2013.01); *B60H 1/2221* (2013.01); *F24H 1/009* (2013.01); *F24H 1/101* (2013.01);
  (Continued)

(58) Field of Classification Search
  USPC ........................................... 219/628
  See application file for complete search history.

(56) References Cited

U.S. PATENT DOCUMENTS 4,141,412 A * 2/1979 Culbertson ........... F28D 9/0068
  165/166
5,000,253 A * 3/1991 Komarnicki .............. F24F 7/08
  165/164
(Continued)

FOREIGN PATENT DOCUMENTS

CN      10162278 A    1/2010
DE       414 920 C    6/1925
(Continued)

OTHER PUBLICATIONS

Chinese Office Action for Chinese Application No. 20130020337.2 dated Jul. 19, 2016 with English translation.

*Primary Examiner* — David Angwin
*Assistant Examiner* — John J Norton
(74) *Attorney, Agent, or Firm* — Muncy, Geissler, Olds & Lowe, P.C.

(57) ABSTRACT

A device for electrically heating a fluid, in particular for use in an electrically operated motor vehicle, comprising an induction coil, which is integrated in an oscillating circuit and produces an alternating magnetic field, and at least one first inductor, which is positioned within the alternating magnetic field. The inductor can be arranged inside a module, through which a fluid to be heated can flow, and the induction coil is arranged outside the module.

10 Claims, 3 Drawing Sheets

(51) Int. Cl.
  *B60H 1/22*  (2006.01)
  *F24H 1/00*  (2006.01)
  *F24H 9/00*  (2006.01)

(52) U.S. Cl.
  CPC ........... *F24H 9/0015* (2013.01); *H05B 6/108* (2013.01); *B60H 2001/2271* (2013.01); *F24H 2250/08* (2013.01)

(56) References Cited

U.S. PATENT DOCUMENTS

| | | | |
|---|---|---|---|
| 5,334,819 A | 8/1994 | Lin | |
| 5,839,646 A * | 11/1998 | Duda | B23K 1/203 228/183 |
| 5,947,375 A * | 9/1999 | Yamano | B60H 1/00392 237/12.3 B |
| 5,990,465 A | 11/1999 | Nakaoka et al. | |
| 8,232,174 B2 | 7/2012 | Goux et al. | |
| 2003/0080115 A1 * | 5/2003 | Zhang | C02F 1/485 219/629 |
| 2003/0094451 A1 | 5/2003 | Hamaguchi | |
| 2009/0012655 A1 * | 1/2009 | Kienman | A61M 1/28 700/300 |
| 2011/0023727 A1 * | 2/2011 | Deane | A23C 3/0332 99/453 |
| 2012/0014680 A1 * | 1/2012 | Emanuel | B60H 1/00278 392/465 |

FOREIGN PATENT DOCUMENTS

| | | |
|---|---|---|
| DE | 1 054 191 B | 4/1959 |
| DE | 196 51 087 A1 | 6/1998 |
| DE | 10 2008 056 991 A1 | 5/2010 |
| EP | 1 935 684 A1 | 6/2008 |
| GB | 2 289 830 A | 11/1995 |
| KR | 10-0956582 B2 | 5/2010 |
| WO | WO 2008/007819 A1 | 1/2008 |

* cited by examiner

Cross Section A-A

Cross Section B-B

MODULAR INDUCTION FLUID HEATER

This nonprovisional application is a continuation of International Application No. PCT/EP2013/057681, which was filed on Apr. 12, 2013, and which claims priority to German Patent Application No. 10 2012 206 603.9, which was filed in Germany on Apr. 20, 2012, and which are both herein incorporated by reference.

BACKGROUND OF THE INVENTION

Field of the Invention

The invention relates to a device for electrically heating a fluid, particularly for use in an electrically operated motor vehicle, the device has an induction coil, which is integrated in an oscillating circuit and generates an alternating magnetic field, and at least one first inductor, which is positioned within the alternating magnetic field.

Description of the Background Art

Today, vehicles operated with internal combustion engines are mostly heated by heating a fluid, which is usually a water/glycol mixture. The fluid that is intended first and foremost for cooling the internal combustion engine is passed through a water to air heat exchanger after it has taken up the heat of the internal combustion engine. The air, which as a cooling fluid flows around the water to air heat exchanger, hereby takes up the thermal energy from the cooling fluid. The cooling fluid is cooled in this way and the air is heated. The heated air is then conveyed into the interior of the vehicle and thereby used for controlling the temperature in the interior.

In vehicles without an internal combustion engine or in high-efficiency diesel engines, there is no waste heat from the engine or it is not sufficient to adequately heat the vehicle cabin according to the driver's wishes. To circumvent this, electrical heaters are being used currently to convert electrical energy into heat. There are essentially two alternatives here. In the first alternative, the air flowing in the interior is heated directly by an electrical auxiliary heater. Such implementations are known, for instance, from EP 1 935 684 A1.

For this purpose, the auxiliary heater is positioned in a region of the interior air intake such that before the air is conveyed into the interior it comes into contact with the electrical auxiliary heater and thus takes up heat. The auxiliary heaters are often installed directly in the vicinity of or on the heat exchanger itself that is provided for heating the air stream by means of the heated cooling water from the combustion engine. This creates an additional parts cost and, moreover, the typically used PTC ceramic elements are rather heavy.

As a second alternative, electrical water heaters are prior in the art that first heat a fluid such as, for instance, the water/glycol mixture used for cooling the internal combustion engine. The heated fluid is then conveyed through an additional water to air heat exchanger, as a result of which the air flowing around the heat exchanger is heated.

The principle functions similar to the heating of air, as it occurs, for instance, in combustion engine-operated vehicles, with the difference that the water/glycol mixture is heated electrically and not by the waste heat from the combustion engine.

A particular disadvantage in conventional methods is the required water circuit for the water/glycol mixture and the additional components, such as, for instance, a water pump, pipes, and valves.

However, a water circuit also provides a relatively simple manner to utilize different waste heat sources, such as an electric motor, battery, or power electronic units that in electric vehicles must be actively cooled, which again suggests the use of cooling water circuits.

Especially in light of the discussion of ranges in the case of only a limited battery capacity, water heating is a frequently used technique in electric vehicles. Also, a water heater can be installed in the engine compartment without a high-voltage component needing to be installed in the passenger compartment, which for some vehicle manufacturers represents a safety problem.

Electrical water heaters are currently realized in that one or more heating elements project into the fluid and give off their heat to the fluid. These elements can be simple metal heating coils or also so-called PTC stones/ceramics. The fact that PTC ceramics (PTC=positive temperature coefficient) have a certain intrinsic safety with respect to overheating because of the temperature dependence of their resistance is advantageous with their use.

A basic disadvantage when using such a water heater is that the employed heating elements must be electrically isolated from the fluid they are to heat. This requirement makes the use of such technology expensive and also has a negative effect on the efficiency and response speed of the heating elements.

SUMMARY OF THE INVENTION

It is therefore an object of the present invention to provide a solution with which a fluid can be heated by direct contact with a heating element, without additional electrical isolation, to increase the efficiency of the heat transfer to the fluid, and to reduce the required parts expenditure and thereby the cost of such a system.

In an embodiment, a device for electrically heating a fluid is provided, particularly for use in an electrically operated vehicle, whereby at least one first inductor can be heated by means of an alternating magnetic field, said inductor which can be positioned within the alternating magnetic field, whereby the inductor is arranged in the interior of a module through which a fluid to be heated can flow.

In an embodiment, an induction coil can be electrically integrated into an oscillating circuit and the induction coil is arranged spatially outside the module.

In an embodiment, the inductor, to generate a turbulent surround-flow and/or through-flow, can have surface elements and/or holes, and/or punches or if the inductor to generate a turbulent surround-flow has a surface made suitable by shaping, particularly by embossing and/or beading, and/or by primary shaping and/or by cutting deformation. The heat transfer between the inductor and the fluid can be increased considerably by a turbulent flow.

The module can be divided. The production of the module is greatly simplified as a result.

In a further embodiment of the invention, the bottom housing part and the top housing part in the interior each can have a partition wall which runs centrally and divides the top housing part or the bottom housing part in each case into a first flow channel and a second flow channel, whereby the first flow channel of the top housing part or of the bottom housing part is in fluid communication with the inlet or outlet of the housing and the second flow channel of the top housing part is in fluid communication with the second flow channel of the bottom housing part. The fluid hereby flows around the inductor in a number of regions and thus the contact time between the fluid and the inductor is longer than in the case of a simple surround-flow with only one flow channel.

The inductor can seal fluid-tight with the walls of the first and second flow channel of the top housing part or of the bottom housing part and can divide the interior of the module into a top and bottom region. This creates a separation into two flow channels in the bottom region and two flow channels in the top region, which again is of benefit for the contact time between the fluid and inductor.

The inductor can have an opening through which the second flow channel of the top region of the module is in fluid communication with the second flow channel of the bottom region of the module. This allows for the passing of fluid between the top and bottom region, which only then enables a complete flow through the module.

In a further embodiment of the invention, the first flow channel of the bottom housing part can be in fluid communication via connections with the second flow channel of the bottom housing part, and the first flow channel of the top housing part with the second flow channel of the top housing part.

In an embodiment, the flow path of the fluid can run via a connector into the module, in the first flow channel of the bottom housing part, in the second flow channel of the bottom housing part through the opening of the inductor, in the second flow channel of the top housing part, in the first flow channel of the top housing part, and finally through a connector out of the module or in the opposite direction.

At least one turbulence insert can be arranged in the module with the inductor. In case the inductor itself has no component for generating a turbulent flow, or the surface of the inductor is not constructed in a suitable form, an additional turbulence insert helps to generate a turbulent flow in order to produce an improved heat transfer between the inductor and the fluid.

In an embodiment, an assembly group is provided having at least one first module and at least one second module, each with at least one inductor, whereby one of the modules is arranged above and one of the modules below the induction coil.

In an embodiment, the flow can pass through the individual modules of the assembly group in series or parallel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
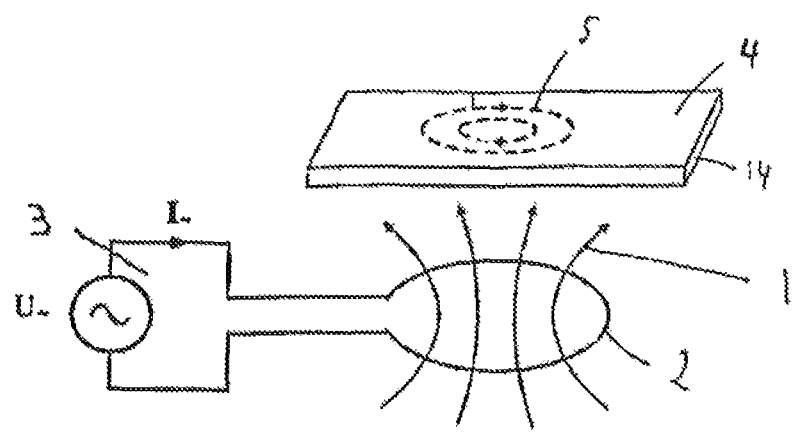
FIG. 1 shows a schematic structure of an induction heating system.

FIG. 1 shows the basic structure of an induction heating system. Shown is induction coil 2 connected to a current circuit 3 that is operated with an alternating voltage. A magnetic field 1 is generated in induction coil 2 by the alternating voltage in current circuit 3. Because of the alternating current applied to current circuit 3, magnetic field 1 is an alternating magnetic field that changes its magnetic orientation with the frequency of the alternating current.

A heating element 4, comprising an electrically conductive material 6, is introduced into magnetic field 1. Eddy currents 5 are induced in heating element 4 due to magnetic field 1. Because eddy currents 5 work against the specific resistance of heating element 4, heat is produced in heating element 4.

It follows that material 6 which comprises heating element 4 must have a certain specific internal resistance to enable an effective heating of heating element 4. The lower the internal resistance of material 6, the lower the heating effect.

Heating element 4 must be arranged at such a distance to induction coil 2 that it is still located within the forming magnetic field. Other elements made of electrically nonconductive materials can be arranged between heating element 4 and induction coil 2.

Induction heating systems are constructed according to this simple principle. In alternative embodiments, heating element 4 can also have different external dimensions and shapes. Thus, in principle, any regular or also irregular arrangement of material 6 of heating element 4 is conceivable.

Figure 2:
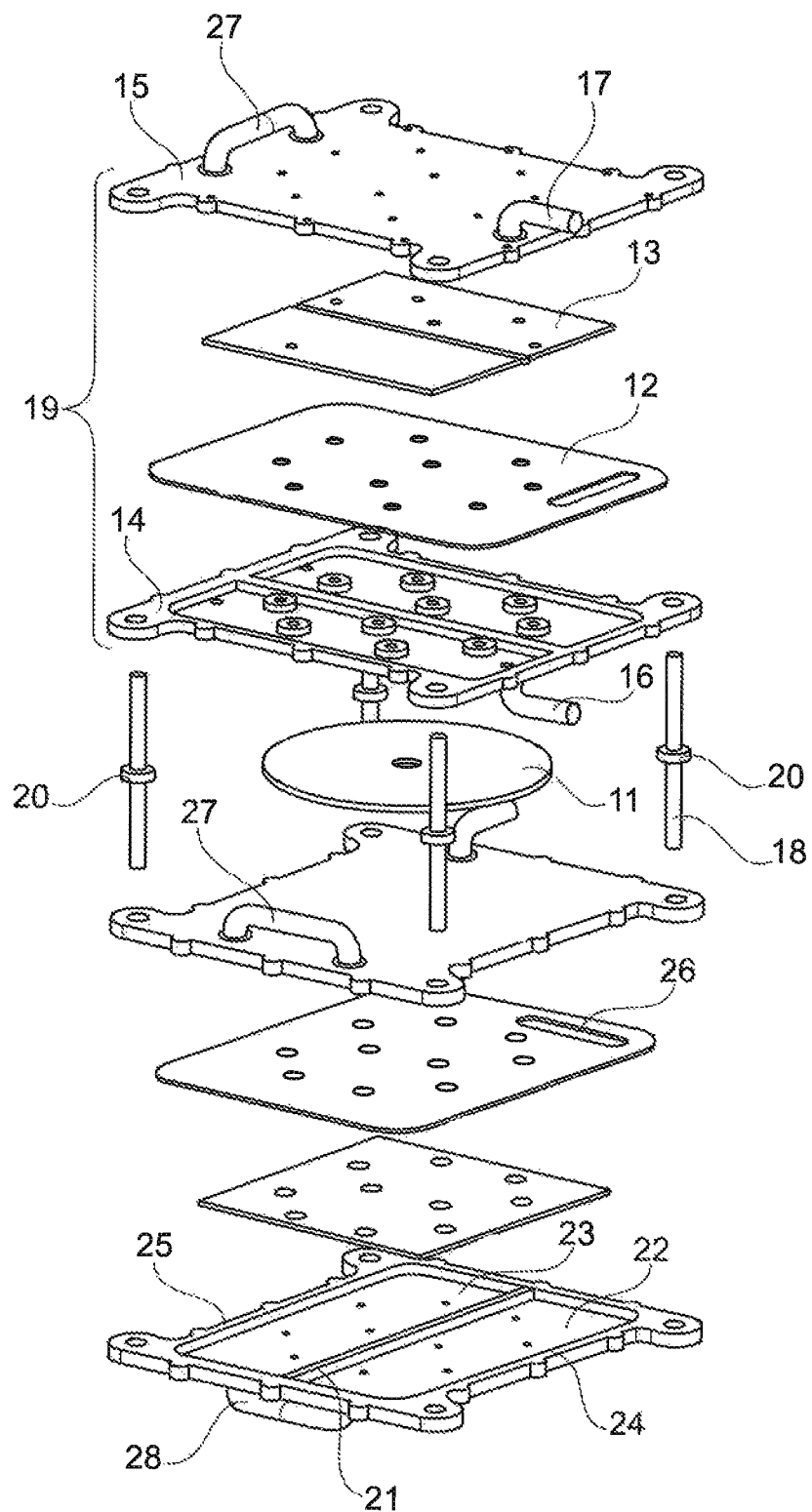
FIG. 2 shows an exploded illustration of an induction heating system of the invention.

FIG. 2 shows a further embodiment of an induction heating system. An induction coil 11 is illustrated. The oscillating circuit to which it is connected for operation, similar to the structure already shown in FIG. 1, is not shown here for reasons of clarity.

Induction coil 11 is positioned between two structurally similar modules 19. Modules 19 are formed substantially from a top housing part 15, a bottom housing part 14, and one or more inductors 12. Depending on the intended use, a turbulence insert 13 can be arranged in addition in module 19.

Above coil 11, a bottom housing part 14 is arranged, which has an inlet or outlet connection 16 for a fluid. An inductor 12 that is heated by currents induced by coil 11, is inserted in bottom housing part 14. Inductor 12 is followed by a turbulence insert 13, which is used to swirl the fluid flowing around inductor 12 for the purpose of improving the heat transfer from inductor 12 to the fluid flowing around it.

In further embodiments of the invention, it is advantageous if inductor 12 itself is designed such that it assumes the function of turbulence insert 13. One part per module 19 can be saved in this way. For the function of the turbulence insert to be taken over by the inductor, the surface structure of the inductor must be designed accordingly. This can be done by using various shaping processes such as, for instance, embossing or the introduction of beading in the inductor. Virtually any surface structures can be produced on the inductor with these two methods.

Additional shapes according to the invention can be attained by a selective primary shaping, for instance. Surface structures can also be produced by cutting methods.

Module 19 is closed by a top housing part 15 that has an inlet or outlet connector 17 for supplying or removing a fluid. Bottom housing part 14 and top housing part 15 are identical in the design shown here, further reducing the variety of parts.

The arrangement of two modules 19, one above and one below induction coil 11, is shown in FIG. 2. Modules 19 in this case are connected at four places by connecting elements 18. Connecting elements 18 have a placeholder 20 that creates a free space for induction coil 11 between modules 19.

During operation, a fluid flows either through connector 16 into bottom housing part 14 or through connector 17 into top housing part 15. This depends only on the selected flow direction and in principle is conceivable in both directions. The fluid is then distributed in module 19 and then flows around turbulence insert 13 and inductor 12, or in the case of a combination component of inductor 12 and turbulence insert 13, only around this one component.

The now heated fluid flows through the respective other connector 16, 17 out of module 19.

In this way, there is no direct contact between the current-carrying coil 11 and inductor 12 in contact with the fluid. Thus, additional isolation can be omitted. The efficiency of the heat transfer can thereby be increased.

The precise design of module 19 and the geometry of inductor 12 or turbulence insert 13 depend greatly on the underlying intended use. Any desired shape of inductor 12 is conceivable in principle. Inductor 12 can also have elevations and depressions, or conductive fins or other elements that contribute to the swirling of the fluid flow.

In alternative embodiments, it is also conceivable to arrange a plurality of inductors within a module. Thus, a plurality of closed channels, through which fluid flows and each of which has an inductor, can be formed by the module. It is also conceivable to stack a plurality of planes through which fluid flows, each with an inductor.

Basically, inductor(s) 12 must be positioned in the magnetic field of coil 11 so that sufficiently strong eddy currents can still be induced in inductor(s) 12.

In alternative embodiments of the invention, an arrangement of only one module in the magnetic field of the coil is also conceivable, as well as the arrangement of a plurality of modules. Care must be taken basically that the inductors that are arranged in the modules, are still arranged within the sphere of action of the magnetic field generated by the coil.

The shaping of the inductor and the induction coil in alternative embodiments may also be different from the design shown in FIG. 2. Thus, for example, a plurality of individual inductors, connected together to form an electrically conductive interconnected network, may also be used as an inductor.

The material selection for module 19 and the tubes surrounding inductor 12 should be made in view of the employed induction method and the other operational requirements. Plastics are advantageously employed here, because no eddy currents can be induced in these, as a result of which unwanted interactions can be reduced.

Figure 3:
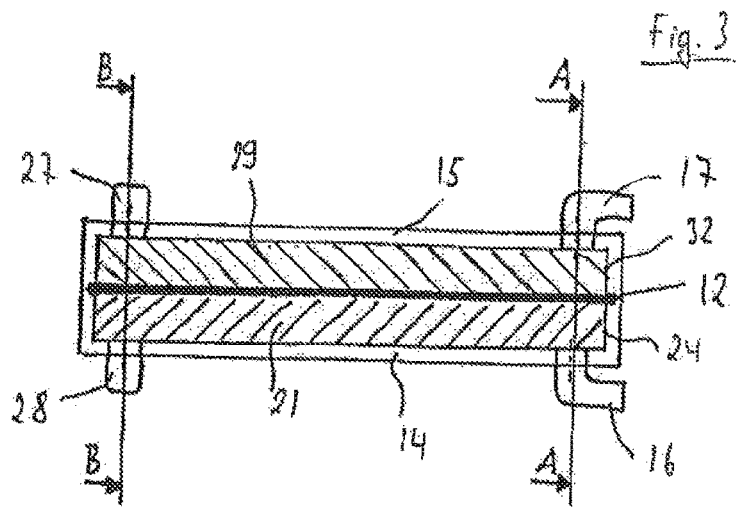
FIG. 3 shows a section through the center plane of one of the modules.
Figure 4:
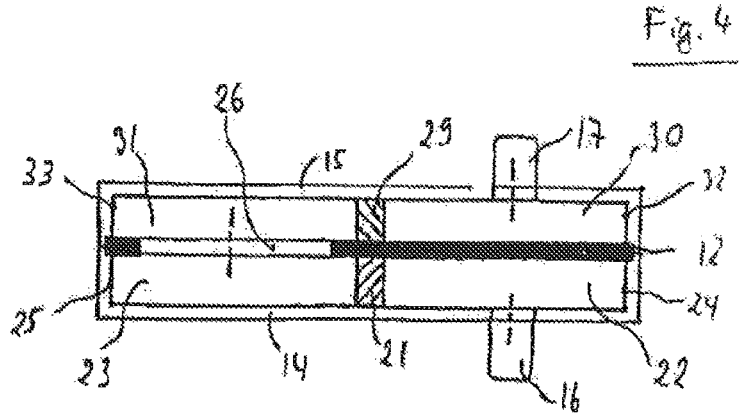
FIG. 4 shows a section through one of the modules according to the sectional plane A-A of FIG. 3.
Figure 5:
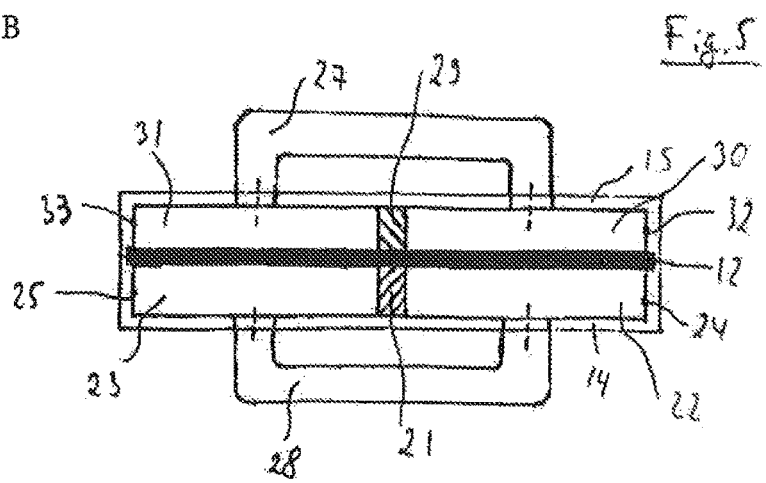
FIG. 5 shows a further section through one of the modules according to the sectional plane B-B of FIG. 3.

FIGS. 3 to 5 each show sections through one of the modules 19. They thereby provide clearer insight into the interior structure of modules 19.

FIG. 3 in this case shows a section through the central plane of one of the modules 19. Shown are the two connectors 16, 17 that are usable as an inlet or outlet, depending on the flow direction.

Inductor 12 is arranged between top housing part 15 and bottom housing part 14, thereby dividing module 19 into a top and bottom region.

A partition wall 21, 29, which in conjunction with inductor 12 divides each housing part 14, 15 into a first flow channel 22, 30 and a second flow channel 23, 31, runs centrally in top housing part 15 and bottom housing part 14. First flow channel 22 of bottom housing part 14 is hereby in fluid communication with second flow channel 23 of bottom housing part 14 via a connection 28. The same applies to top housing part 15 where first flow channel 30 is in fluid communication with second flow channel 31 via connection 27.

FIG. 4 shows a section according to sectional plane A-A shown in FIG. 3. Additionally shown in the figure is opening 26 of inductor 12, apart from the elements already shown in FIG. 3 and described above. Second flow channel 31 of bottom housing part 14 is in fluid communication via this opening 28 with second flow channel 31 of top housing part 15.

It can be easily recognized that top partition wall 29 and bottom partition wall 21 is closed with inductor 1 and thus housing parts 14, 15 are divided into two flow channels 22, 23, 30, 31.

First flow channel 22 of bottom housing part 14 is thus formed by inductor 12, wall 24, and partition wall 21. Second flow channel 23 of bottom housing part 14 is formed by inductor 12, wall 25, and partition wall 21. Similarly, first flow channel 30 of top housing part 15 is formed by inductor 12, wall 32, and partition wall 29 and second flow channel 31 of top housing part 15 by inductor 12, wall 33, and partition wall 29.

FIG. 5 shows a section through one of the modules 19 according to sectional plane B-B shown in FIG. 3.

This section lies within the region of the two connections 27, 28, each of which connect first flow channels 22, 30 with second flow channels 23, 31. As shown in FIG. 5, the two connectors 27, 28 form enclosed channels that extend outside of the module 19.

Connectors 16, 17 can be used optionally as an inlet or outlet. This depends on the selected flow direction. The flow sequence of a module 19 is described hereafter in case that connector 16 is used as an inlet and connector 17 as an outlet of module 19.

The fluid then flows through connector 16 into first flow channel 22 of bottom housing part 14, subsequently flows through connection 28 into second flow channel 23 of bottom housing part 14, then through opening 26 into second flow channel 31 of top housing part 15, through connection 27 into first flow channel 30 of top housing part 15, and finally through connector 17 out of module 19.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for electrically heating a fluid for use in an electrically operated motor vehicle, the device comprising:
   an induction coil that generates an alternating magnetic field; and
   at least one inductor that is heatable by the alternating magnetic field, the inductor being arranged within the alternating magnetic field, wherein the inductor is arranged in an interior of a module that is adapted to have a fluid to be heated flow therethrough, wherein a bottom housing part and a top housing part of the module each have a partition wall inside that runs centrally and divides the top housing part or the bottom housing part in each case into a first flow channel and a second flow channel, and wherein the first flow channel of the top housing part or of the bottom housing part is in fluid communication with an inlet or outlet of the module and the second flow channel of the top housing part is in fluid communication with the second flow channel of the bottom housing part, wherein the induction coil is arranged outside of the module, wherein the inductor seals fluid-tight with walls of the first flow channel and walls of the second flow channel of the top housing part or of the bottom housing part and the inductor divides an interior of the module into a top and bottom region, wherein the first flow channel of the bottom housing part is in fluid communication via a first connection with the second flow channel of the bottom housing part, and the first flow channel of the top housing part is in fluid communication via a second connection with the second flow channel of the top housing part, and wherein the first connection and the second connection each include an enclosed channel that extends outside of the module to connect the first flow channels to the second flow channels of the top and bottom housing parts.

2. The device according to claim 1, wherein the induction coil is electrically integrated into an oscillating circuit.

3. The device according to claim 1, wherein the inductor, to generate a turbulent surround-flow and/or through-flow, has surface elements, holes, and/or punches.

4. The device according to claim 1, wherein the inductor, to generate a turbulent surround-flow, has a suitably shaped surface by embossing, beading, primary shaping and/or cutting deformation.

5. The device according to claim 1, wherein the module is dividable.

6. The device according to claim 1, wherein the inductor has an opening through which the second flow channel of the top region of the module is in fluid communication with the second flow channel of the bottom region of the module.

7. The device according to claim 1, wherein a flow path of the fluid runs via a connector into the module, in the first flow channel of the bottom housing part, in the second flow channel of the bottom housing part through an opening of the inductor, in the second flow channel of the top housing part, in the first flow channel of the top housing part, and finally through a connector out of the module or in an opposite direction.

8. The device according to claim 1, wherein at least one turbulence insert is arranged in the module with the inductor.

9. An assembly group having at least one first module and at least one second module, each according to the module of claim 1, wherein one of the modules is arranged above and one of the modules below the induction coil.

10. The assembly group according to claim 9, wherein a flow of the fluid passes through the individual modules in series or parallel.

* * * * *